United States Patent [19]

Glover et al.

[11] Patent Number: 4,598,809

[45] Date of Patent: Jul. 8, 1986

[54] CABLE-AND-SLEEVE CONNECTOR

[75] Inventors: John H. Glover; Edward J. Arnold; Peter A. G. Clissett, all of Worcestershire, England

[73] Assignee: BWP Controls, Worcestershire, England

[21] Appl. No.: 673,972

[22] Filed: Jan. 23, 1985

[51] Int. Cl.[4] ............................................. F16D 13/75
[52] U.S. Cl. ............................ 192/111 A; 192/70.25; 188/196 B
[58] Field of Search ..................... 192/70.25, 111 A; 188/196 B, 196 P, 196 V; 74/501.5 R; 24/136 R; 411/432, 433; 269/181, 182

[56] References Cited

U.S. PATENT DOCUMENTS

| | | | |
|---|---|---|---|
| 2,712,861 | 7/1955 | Gaver | 188/196 B |
| 2,788,095 | 4/1957 | Brooks | 188/196 B |
| 3,566,996 | 3/1971 | Crossman | 188/196 B |
| 4,304,322 | 12/1981 | Beccaris | 192/111 A |
| 4,344,518 | 8/1982 | Gilmore | 192/111 A |

FOREIGN PATENT DOCUMENTS 1102844 10/1955 France ........................ 188/196 B Primary Examiner—William F. Pate, III
Assistant Examiner—James J. Merek
Attorney, Agent, or Firm—Pennie & Edmonds

[57] ABSTRACT

In a cable-and-sleeve connector, variations in the real or effective length of the cable 3 will tend to vary the curvature of the sleeve 7, and this can be accommodated by variations in the effective length of the sleeve 7. For this purpose, one end of the sleeve 7 is adjustably fixed to an anchor 6 by a clutch 30. The clutch consists of four collet members 31 that, when effective as a clutch, are wedged within the tapering aperture 29 so as to be held with the serrations 32 on the internal surfaces of the collet members 31 mating with external serrations on the rigid end of the sleeve 7. When the clutch 30 is disengaged, the collet members 31 move out of the aperture 29, in the direction of the sleeve 7, and tilt loosely about their wider ends so that the wider ends are only just free of the serrations 21. Disengagement is effected, when the cable 3 is relaxed, by a member 40 being moved by the sleeve part 9 to push the collet members 31 out of the aperture 29 and lifting them out of engagement with the serrations 21. When the cable is brought under tension, the effect of the member 40 is removed and the spring 35, through the member 36, pushes the collet members 31 into their effective condition. Since the serrations of the wider ends of the collet members were only just clear of the serrations on the rigid end of the sleeve 7, the chance of mis-match on re-engagement is small so the connection operates reliably and quietly. Projections 36a co-operate with recesses 31a in the collet members 31 to limit the movement of the latter while allowing them sufficient freedom to move clear of the serrations 21.

3 Claims, 5 Drawing Figures

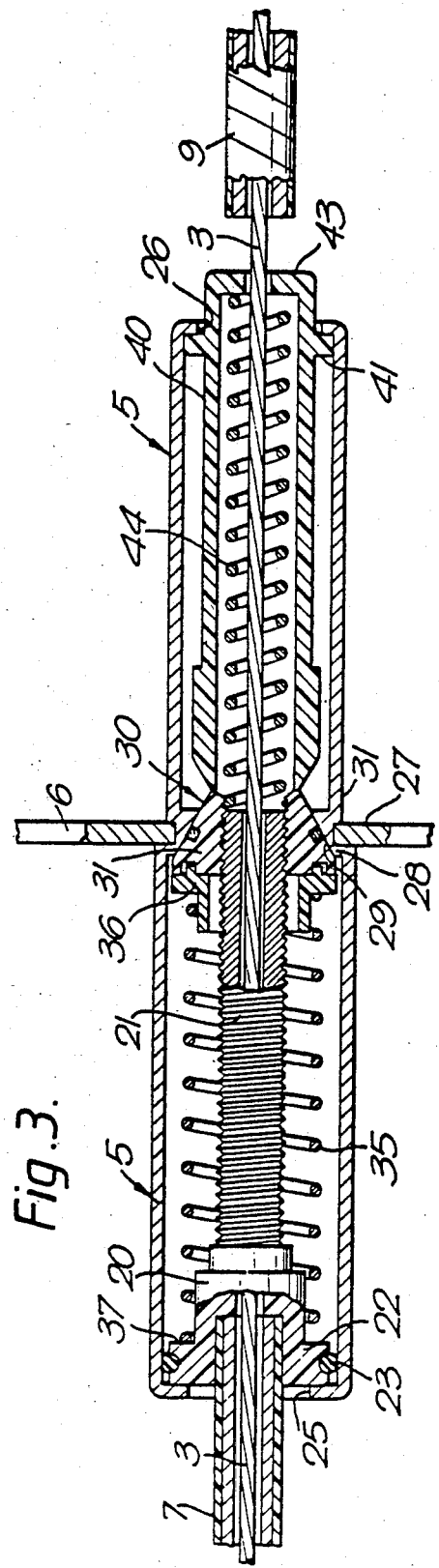
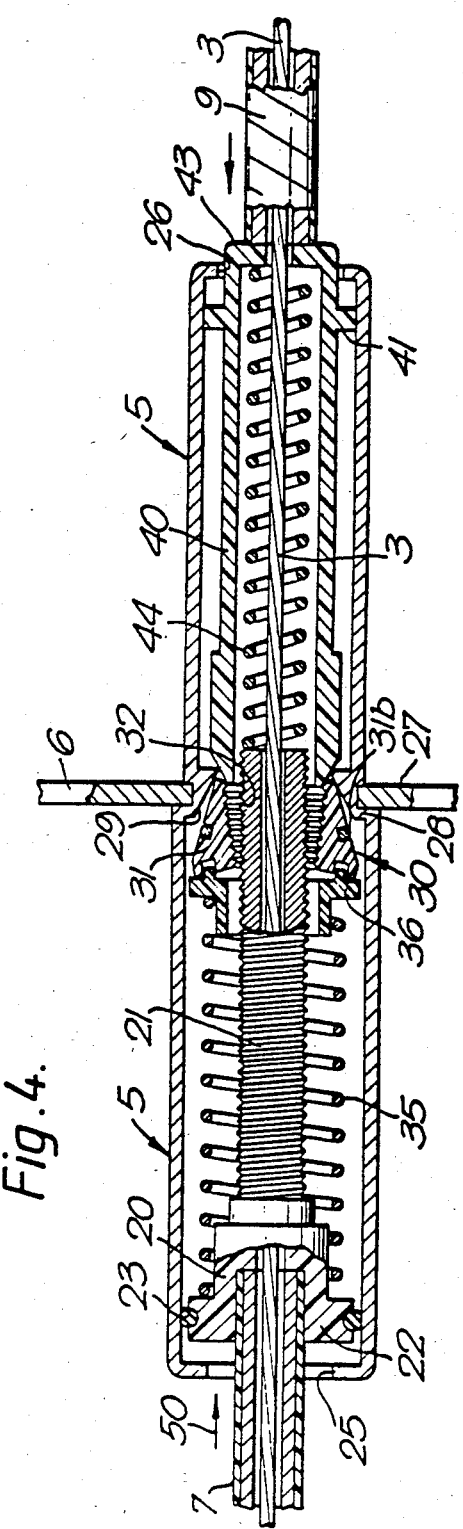

CABLE-AND-SLEEVE CONNECTOR

DESCRIPTION

This invention is concerned with cable-and-sleeve connectors such as are widely used, for example, in automobiles to connect the clutch or brake to an actuation member by which operation of the clutch or brake can be effected. Such connectors can easily be curved, to pass round corners, for instance, and need not be rigidly supported along their length, with the result that some deformability of the curve or curves is possible.

Now in manual shift systems of automobiles the clutch facing plate wears during use resulting in the relatively heavy clutch spring drawing the cable further towards the clutch and effectively shortening the cable so that play will be introduced between clutch pedal and the cable. On the other hand, in braking systems, the effective length of the cable is increased as brake shoes wear down which results in undesirable play being introduced into the brake system requiring the brake pedal to be depressed excessively before a braking force is exerted.

Undesirable play can also be introduced into a cable-and-sleeve connector as a result of wear between the cable and the inner wall of the sleeve. In addition wear may occur between a cable and a sleeve over which the cable extends and this may introduce undesirable play into a control cable system.

In European Patent Publication No. 0 048 620 there is described a cable-and-sleeve connector designed to reduce this play. This connector includes collets having serrations that mate with serrations on a threaded member when the cable is operative and under tension and that lie clear of the serrations when the cable is inoperative and relaxed. The present invention proposes a modification of this earlier proposal that is intended to facilitate the reliable co-operation of the collets with the serrations and that may result in more quiet operation of the connector.

According to the present invention, there is provided a cable-and-sleeve connector in which one end of the cable is connected to an actuation member and the other end is connected to a controlled member, and the sleeve extends along a curved, deformable, path between two anchors to which it is connected, the end of the sleeve remote from the controlled member is rigid and externally serrated, the anchor corresponding to that end of the sleeve provides an opening through which the cable passes and that tapers away from the controlled member, and the connection between the sleeve and the anchor means is effected by collet members disposed around the sleeve and having internal serrations that mate with the serrations of the sleeve and of which the external surfaces are such that the collet members mate, and are wedged, within the opening, means being provided to urge the collet members towards this engaged condition, and means being provided that, when the actuation member is operative, permits engagement of the collet members with the sleeve and opening and that, as the actuation member moves to its inoperative condition, acts on the collet members to move them outwardly out of engagement with the sleeve, the collet members being so constrained that their wider ends can move outwardly only to an extent that just permits the rigid end of the sleeve to move axially of itself relatively to the collet members. By way of example, an embodiment of the invention will now be described with reference to the accompanying drawings in which:

FIG. 3 is an enlarged axial section of the self-adjusting mechanism, illustrating the relative positioning of its components when the cable is under tension:

FIG. 4 is an enlarged axial section of the self-adjusting mechanism illustrating the relative positioing of its components when the cable is relaxed.

Figure 1:
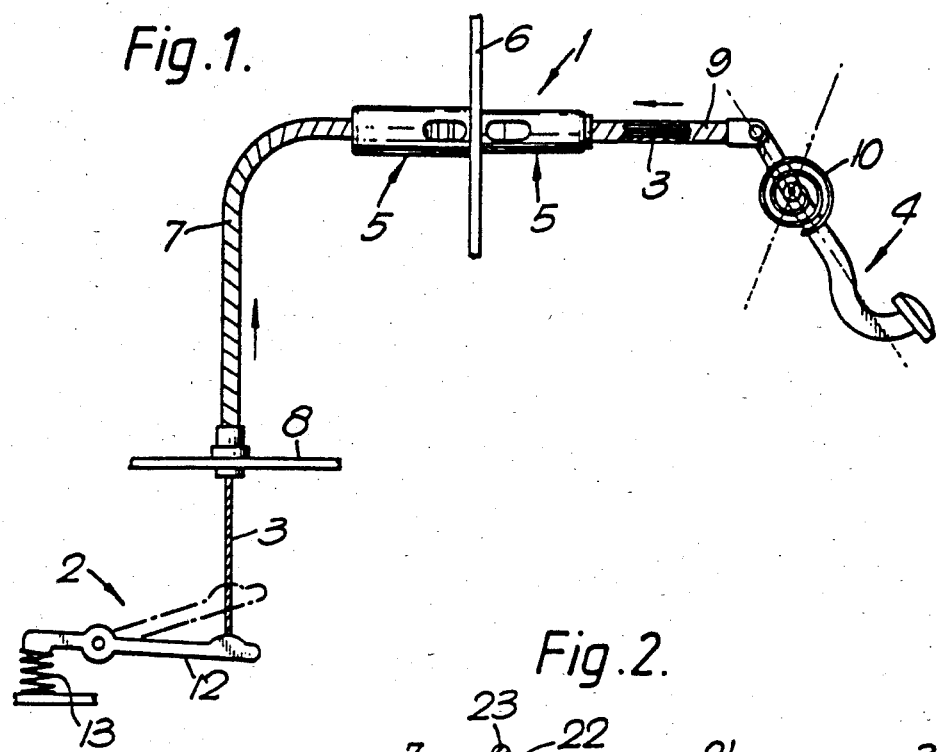
FIG. 1 is a schematic view of part of a clutch, a clutch pedal, and a curving cable-and-sleeve connection between the two that includes a self-adjusting mechanism by which the effective length of the sleeve can be varied.

In the apparatus illustrated in the drawings, a controlled member, in the form of a clutch 2, is connected by a control cable 3 to an actuation member, in the form of a clutch pedal 4 of an automobile. The cable 3 extends through the housing 5 of a self-adjusting mechanism indicated generally at 1. The housing 5 itself extends through, and is fixed to, an anchor in the form of a fire wall 6 separating the engine compartment on the left from the passenger compartment on the right. On the engine side, the cable 3 extends through a first sleeve part 7 and on the passenger side, the cable 3 extends through a second sleeve part 9. One end of the sleeve part 7 is fixed to an anchor 8 whilst the other end is connected to the housing 5 in a way, as will be explained later, that is automatically adjustable to compensate for variations in the length of the cable 3. Between the ends of the sleeve part 7, the cable 3 and the sleeve part 7 are curved and sufficiently unrestrained to enable the curvature to change to some extent.

To actuate the clutch 2, the clutch pedal 4 is depressed, so applying an operating tension to the cable 3. A pedal return spring 10 serves to return the clutch pedal 4 to an "up" position. The clutch 2 includes a lever 12 that controls a clutch spring 13 that normally forces facing plates, not shown, of the clutch into driving engagement with a pressure of 41 Kgm. By depressing pedal 4, tension is exerted upon the control cable 3 which will move the lever 12 to relieve the clutch plates of the force normally exerted by clutch spring 13, allowing gears to be shifted.

Figure 2:
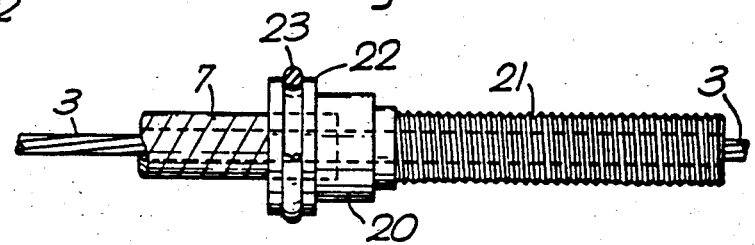
FIG. 2 is an enlarged side view of a component of the self-adjusting mechanism.

As shown in FIG. 2, an end portion of the sleeve part 7, which extends into the housing 5, is in the form of a rigid tubular member 20 providing at one end a guide collar 22 onto which an O ring 23 that fits within the housing 5 is placed. Beyond the collar 22 the outer surface of the member 20 is serrated at 21.

More details of the self-adjusting mechanism of which the housing 5 is a part are shown in FIGS. 3 and 4. The housing 5 has an aperture 25 at one end, through which the first sleeve part 7 extends and an aperture 26 at its opposite end. The housing 5 is formed externally with an annular groove 27 in which the fire wall 6 lies to anchor the housing and, therefore, the self-adjusting mechanism. The housing is divided internally by a shoulder 28, the opening through which is defined by a circular wall portion 29 that tapers towards the passage compartment.

Figure 5:
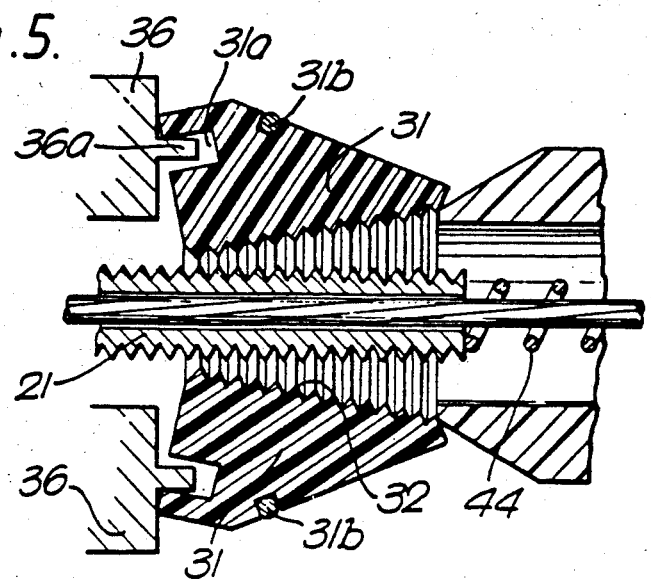
FIG. 5 is a detail of FIG. 4 on an enlarged scale.

A clutch means 30, that includes four collet members 31 is arranged to co-operate with the serrations 21. When the collet members are side-by-side in the position in which they are shown in FIG. 3, their outer surfaces form a cone that matches, and mates with, the circular wall portion 29. The inner surfaces of the collet members 31 are provided with serrations 32 which mate with the serrations 21 when the outer surfaces of the collet members 31 mate with the circular wall portion 29. The wider ends of the collet members 31 are each provided with a recess 31a (see FIG. 5) and a ring 31b surrounding the collet members 31 limits the extent to which their wider ends can move relatively to each other.

The rigid tubular member 20 is surrounded by a first helical spring 35 extending between a loose-fitting collar 36, which bears on an end of the collet member 31, and the shoulder 37 formed by the end of the collar 22. The collar 36 carries projections 36a that are received loosely within the recesses 31a. The effect of the mating of the projections 36a with the recesses 31a is to permit the collet members 31 to move radially outwardly sufficiently just to release the serrations 32 from the serrations 21 and yet act as hinges to allow the narrower ends of the collet members 31 to move more clearly free of the serrations 21. The spring 35 will normally be effective to urge the collets 31 into contact with the tapered wall 29; as a result of such contact the collet members 31 will be urged radially inwardly so that the serrations 32 engage with the serrations 21 of the sleeve part 7.

To enable disengagement of the collet members 31 from the sleeve part 7 to be effected, a clutch release means, in the form of a tubular member 40, is positioned co-axially within housing 5 around control cable 3. The tubular member 40 has a shoulder 41 which abuts a flange that defines the opening 26 to prevent the member 40 from being moved out of the housing and also acts as a guide when the member 40 moves within the housing 5. The end portion of the member 40 protrudes through the aperture 26 so that the end wall 43 may be abutted by the end of the second sleeve 9. The other end of the member 40 abuts the collet members 31 and is chamfered so that it will tend to force the narrow ends of the collet members 31 radially outwards.

A helical spring 44 acting within the housing 5 between the end of the sleeve 7 and the end wall 43 urges the shoulder 41 towards contact with the end of the housing.

The operation of what has been described will now be explained. When, as shown in FIG. 3, tension is exerted on the control cable 3 by depression of pedal 4, the control cable will be tensioned to pull the lever 12 against the force of the relatively heavy clutch spring 13 to release the clutch plates that the spring normally holds in engagement. Movement of the pedal 4 will allow the second sleeve part 9 to move and so relieve the compression on the spring 44 which will, in turn, move the tubular member 40 to the right until the shoulder 41 is in abutment with the flange defining the opening 26 of the housing 5. First spring means 35 can then become effective to force the outer peripheral surfaces 33 of the collet members 31 into engagement with the tapered wall 29 of the housing, and further axial movement of the collet members in that direction will move them radially inwardly until the serrations 32 of the collet members 31 engage within the serrations 21 on the tubular member 20 and so lock that end of the sleeve part 7 with respect to the housing. The engagement will be positive and precise since the wider ends of the collet members 31 have remained close to the serrations 21. The elimination in this way of the possibility of a mismatch is also likely to result in a more quiet operation.

When the pedal 4 is released, it will rotate in a counter-clockwise direction and move the second sleeve part 9 to the left until, as shown in FIG. 4, it engages the end of the member 40. Further movement of the sleeve part 9 will move the member 40 to the left and this will move the collet members 31 to the left against the force of the first spring 35, splaying out the narrower ends of the collet members 31 but leaving the wider ends in brushing contact with the serrations 21. This releases the locking effect of the collet members 31 on the members 20 so that it may move longitudinally of itself within the housing 5.

When the system is installed in a manual transmission system, progressive wear of the clutch plates will cause the pedal 12 to move progressively further from the anchor 8 when the pedal 4 is released. This additional "length" is provided by a variation in, or deformation of, the curvature of the first sleeve part 7 and by a corresponding shortening of the real length of the sleeve part 7 lying between the anchor 8 and the collet members 31. When the collet members 31 are released from the member 20, then that end of the first sleeve part 7 can move in the direction of the arrow 50 of FIG. 4 in accordance with the changes in its curvature. The device that has been described acts in the same way to accommodate real increases in the length of the cable 3 such as might result from stretching of the cable. To accommodate any real or effective reduction in the length of the cable 3 (such as might result if the clutch 2 were supposed to be replaced by a brake of which the shoes wear), then compensating change in the length of the sleeve part 7 would result from the movement of the member 20 in the opposite sense to the arrow 50.

The apparatus that has been described can readily be installed in an existing system.

We claim:

1. A cable and a sleeve connector in which one end of the cable is connected to an actuation member and the other end is connected to a controlled member, and the sleeve extends along a curved, deformable, path between two anchors to which it is connected, the end of the sleeve remote from the controlled member is rigid and externally serrated, the anchor corresponding to that end of the sleeve provides an opening through which the cable passes and that tapers away from the controlled member, and the connection between the sleeve and the anchor means is effected by collet members disposed around the sleeve and having internal serrations that mate with the serrations of the sleeve and of which the external surfaces are tapered away from the controlled member and pivotally mounted at the wider ends about a mounting such that the collet members mate, and are wedged, within the opening, means being provided to urge the collet members towards this engaged condition, and means being provided that, when the actuation member is operative, permits engagement of the collet members with the sleeve and opening and that, as the actuation member moves to its inoperative condition, acts on the collet members to move them outwardly out of engagement with the sleeve, the collet members being so constrained at the mounting that their wider ends can move outwardly only to an extent that just permits the rigid parts of the sleeve to move axially of itself relatively to the collet members.

2. A cable and a sleeve connector in which one end of the cable is connected to an actuation member and the other end is connected to a controlled member, and the sleeve extends along a curved, deformable, path between two anchors to which it is connected, the end of the sleeve remote from the controlled member is rigid and externally serrated, the anchor corresponding to that end of the sleeve provides an opening through which the cable passes and that tapers away from the controlled member, and the connection between the sleeve and the anchor means is effected by collet members disposed around the sleeve and having internal serrations that mate with the serrations of the sleeve and of which the external surfaces are such that the collet members mate, and are wedged, within the opening, means being provided to urge the collet members towards this engaged condition, and means being provided that, when the actuation member is operative, permits engagement of the collet members with the sleeve and opening and that, as the actuation member moves to its inoperative condition, acts on the collet members to move them outwardly out of engagement with the sleeve, the collet members being so constrained that their wider ends can move outwardly only to an extent that just permits the rigid parts of the sleeve to move axially of itself relatively to the collet members in which the means provided to urge the collet members towards the engaged condition includes an annular surface encircling the sleeve and abutting the end faces of the wider ends of the collet members and the movement of the wider ends of the collet members is restricted by projections extending from the annular surface and lying in recesses in the end faces of the wider ends.

3. A cable-and-sleeve connector as claimed in either claim 1 or 2 in which the means that may act on the collet members to move them outwardly includes a sleeve that encircles the cable and of which one end abuts the narrow end of the collet members, the end being chamfered to facilitate its entry under the narrower ends of the collet members.

* * * * *